United States Patent
Winston et al.

(10) Patent No.: US 11,774,498 B2
(45) Date of Patent: Oct. 3, 2023

(54) MULTI-RATE SAMPLING FOR HIERARCHICAL SYSTEM ANALYSIS

(71) Applicant: International Business Machines Corporation, Armonk, NY (US)

(72) Inventors: David Wells Winston, Asheville, NC (US); Tong Li, Austin, TX (US); Richard Daniel Kimmel, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 17/340,631

(22) Filed: Jun. 7, 2021

(65) Prior Publication Data

US 2022/0390514 A1    Dec. 8, 2022

(51) Int. Cl.
*G01R 31/319* (2006.01)
*G06N 20/00* (2019.01)
*G01R 31/3183* (2006.01)

(52) U.S. Cl.
CPC .......... *G01R 31/31901* (2013.01); *G01R 31/318314* (2013.01); *G01R 31/318357* (2013.01); *G06N 20/00* (2019.01)

(58) Field of Classification Search
CPC ...... G01R 31/31901; G01R 31/318314; G01R 31/318357; G06N 20/00
USPC ........................................................ 714/741
See application file for complete search history.

(56) References Cited

U.S. PATENT DOCUMENTS

| | | | |
|---|---|---|---|
| 5,301,118 A | 4/1994 | Heck | |
| 8,122,404 B2 | 2/2012 | Sinha | |
| 8,453,102 B1 | 5/2013 | Pack | |
| 9,348,680 B2 | 5/2016 | Joshi | |
| 9,483,602 B2 * | 11/2016 | McConaghy | G06F 30/367 |
| 9,753,895 B2 | 9/2017 | Kuo | |
| 9,805,158 B1 | 10/2017 | Liu | |
| 9,836,564 B1 | 12/2017 | Zhang | |
| 9,940,418 B2 | 4/2018 | Jallepalli | |
| 11,562,110 B1 * | 1/2023 | Zhang | G06N 7/00 |
| 2009/0248370 A1 | 10/2009 | Rutenbar | |
| 2010/0250187 A1 | 9/2010 | Zuber | |
| 2020/0026807 A1 * | 1/2020 | Sha | G03F 7/705 |
| 2022/0390514 A1 * | 12/2022 | Winston | G01R 31/318314 |

OTHER PUBLICATIONS

"Gumbel distribution", From Wikipedia, the free encyclopedia, last edited on May 11, 2021, 3 pps., <https://en.wikipedia.org/wiki/Gumbel_distribution>.

(Continued)

*Primary Examiner* — James C Kerveros
(74) *Attorney, Agent, or Firm* — David K. Mattheis

(57) ABSTRACT

System analysis by receiving a model of a complex system design. The model includes at least one layer. The analysis includes performing a plurality of simulations of the performance of the layer. The number of simulations is determined according to a number of system components associated with the layer. The analysis further includes determining a worst-case result for a set of simulations from the plurality of simulations and assigning the worst-case result to an overall system simulation.

20 Claims, 4 Drawing Sheets

(56) References Cited

OTHER PUBLICATIONS

Ding et al, "Improving the efficiency of Monte Carlo power estimation [VLSI]," in IEEE Transactions on Very Large Scale Integration (VLSI) Systems, vol. 8, No. 5, pp. 584-593, Oct. 2000, doi: 10.1109/92.894163.
Keramat et al., "A study of stratified sampling in variance reduction techniques for parametric yield estimation," 1997 IEEE International Symposium on Circuits and Systems (ISCAS), Hong Kong, China, 1997, pp. 1652-1655, vol. 3, doi: 10.1109/ISCAS.1997.621450.
Kurker et al, "Hierarchical yield estimation of large analog integrated circuits," in IEEE Journal of Solid-State Circuits, vol. 28, No. 3, pp. 203-209, Mar. 1993, doi: 10.1109/4.209986.
Li et al, "DRAM Yield Analysis and Optimization by a Statistical Design Approach," in IEEE Transactions on Circuits and Systems I: Regular Papers, vol. 58, No. 12, pp. 2906-2918, Dec. 2011, doi: 10.1109/TCSI.2011.2157741.
Maricau et al, "Hierarchical analog circuit reliability analysis using multivariate nonlinear regression and active learning sample selection," 2012 Design, Automation & Test in Europe Conference & Exhibition (Date), Dresden, Germany, 2012, pp. 745-750, doi: 10.1109/DATE.2012.6176568.
Mell et al., "The NIST Definition of Cloud Computing", National Institute of Standards and Technology, U.S. Department of Commerce, NIST Special Publication 800-145, Sep. 2011, 7 pages.
Yu et al., "Yield-aware hierarchical optimization of large analog integrated circuits," 2008 IEEE/ACM International Conference on Computer-Aided Design, San Jose, CA, USA, 2008, pp. 79-84, doi: 10.1109/ICCAD.2008.4681555.

* cited by examiner

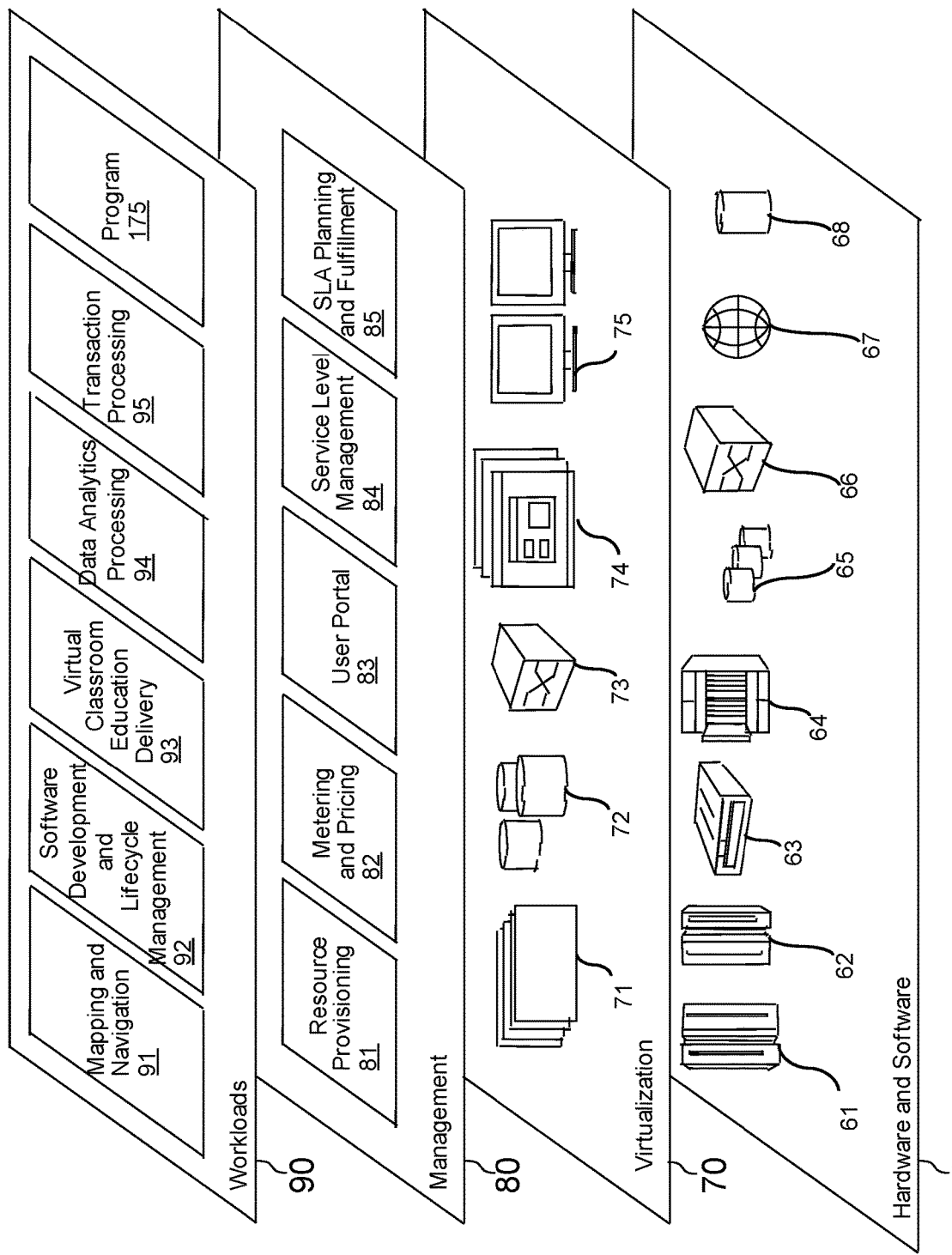

MULTI-RATE SAMPLING FOR HIERARCHICAL SYSTEM ANALYSIS

FIELD OF THE INVENTION

The disclosure relates generally to the analysis of complex systems through simulation. The disclosure relates particularly to complex system analysis through multi-rate sampling of system elements.

Monte Carlo simulations substitute values from defined probability distributions for systems parameters having known uncertainties. These simulations provide outputs associated with possible system performance states. Full Monte Carlo simulations use a model of a complete system with substitutions for each possible system variable. The Monte Carlo methods are a broad class of computational algorithms that rely on repeated random sampling to obtain numerical results. The mechanism driving these algorithms utilizes randomness to solve problems that might be deterministic in principle. Monte Carlo methods require every source of statistical variation to be sampled randomly according to the corresponding probability density function of the source of variation. Methods simulate each sample set with a circuit simulator to determine the pass/fail result of the circuit. The method tabulates the results and computes a failure probability. This can take a prohibitively long period of time when the number of sample numbers is in the billions. Also, finding the overall failure rate, while helpful, does not provide insight into the actual failure mechanism.

Monte Carlo analysis can be accelerated by a variety of techniques including Importance Sampling, Scaled Sigma Sampling, Worse Case Distance, and various other methods. These methods modify the Monte Carlo sampling in order to reduce the total number of samples required for the analysis. The circuit simulation can be accelerated by using macro modeling, cross section analysis, machine learning, or various other methods in which either the number or accuracy of each simulation result is reduced. Regardless of the method employed, they all strive to trade accuracy of the result for reduced run-time between the processes.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable system analysis.

Aspects of the invention disclose methods, systems and computer readable media associated with system analysis by receiving a model of a complex system design. The model includes at least one layer. The analysis includes performing a plurality of simulations of the performance of the layer. The method determines the number of simulations according to a number of system component associated with the layer. The analysis further includes determining a worst-case result for a set of simulations of the layer from the simulations and assigning each worst-case result to an overall system simulation.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts abstraction model layers, according to an embodiment of the invention.

DETAILED DESCRIPTION

Figure 1:
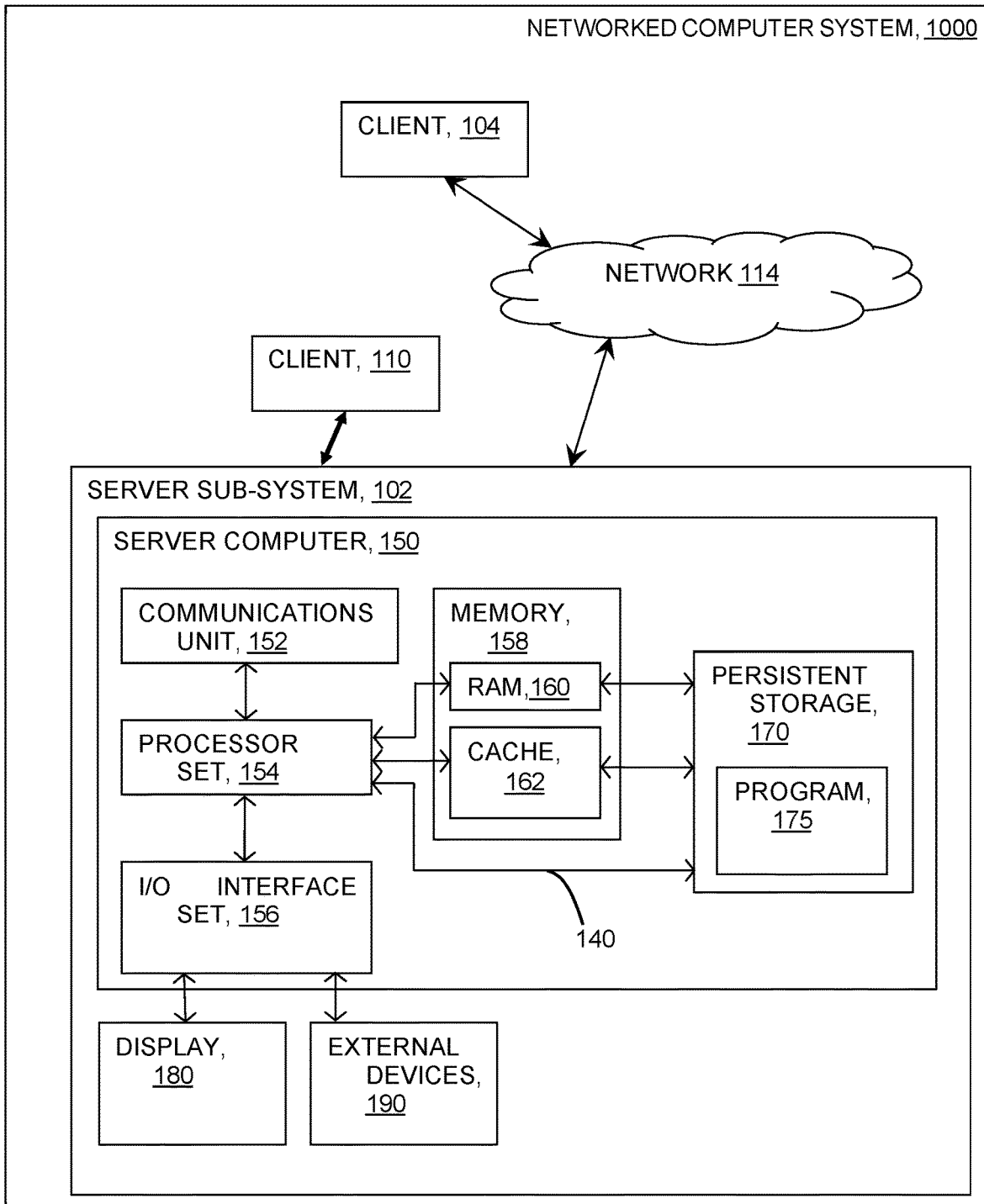
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Monte Carlo analysis in conjunction with accurate circuit simulation is the gold standard for estimating circuit failure probabilities prior to manufacturing. However due to the computing time for circuit simulation (particularly for large circuits) and the large number of random Monte Carlo samples required for low failure circuits, there are numerous methods for accelerating both the Monte Carlo analysis itself and the corresponding circuit simulation.

Accelerating circuit simulation by reducing the size and/or complexity of the circuit description often results in an inaccurate Monte Carlo analysis because the reduced circuit description may not accurately represent the statistical nature of the complete design. A simple example is a memory array where there are a repeated number of bitcells all feeding into a single sense amp or other control logic. A reduced circuit description useful for simulating, for example, the read/write performance of the array may only include a single active bit cell and a single sense amp. However, this reduced circuit description is not useful for statistical analysis because it does not represent the statistics of multiple bit cells feeding a single sense amp.

There are a variety of methods to deal with this problem, but they involve analyzing different parts of the circuit separately. In the array example above, prior art methods would analyze the statistical nature of the bitcells independently of the sense amp and then approximate the overall statistical behavior of the bitcells and sense amps working together. This process can be difficult and inaccurate. It is not always obvious how to characterize different portions of the circuit with multiple Monte Carlo analyses. That can then lead to an inaccurate result when integrating the statistics of different portions of the circuit into a final result. Disclosed embodiments provide a statistical method that can analyze a reduced circuit description that is also accurate and statistically equivalent to a Monte Carlo analysis of the actual circuit design.

Traditional Monte Carlo analysis randomly samples all statistical variables present in the circuit description according to the specified probability distribution of each variable. When applied to a reduced circuit description that does not correctly represent the number of repeated subcircuits in the actual design, this will result in an inaccurate statistical analysis.

The invention proposed here is a "multi-rate sampling" method for Monte Carlo analysis. This method can be applied to reduced circuit descriptions while producing statistically accurate results. This method starts by generating a "master" Monte Carlo sample for the reduced circuit. However, when a reduced circuit description represents an actual design that contains a greater number of subcircuits, the statistical variables are sampled at a rate according to the actual number of subcircuits. Multiple rates are employed, each rate determined according to the actual number of subcircuits. This produces a number of sample "variants" that correspond to the number of repeated subcircuits. The sample "variants" are then analyzed using standard methods (i.e. circuit simulation, machine learning, etc.) to determine the worse performing variant. This worst performing variant is then associated with the "master" Monte Carlo sample and the method repeats itself with the next Monte Carlo sample. In this embodiment, the method generates a block of master Monte Carlo samples according to the desired degree of confidence desired in the output. As an example, the method generates a block of one thousand Monte Carlo samples and provides an output failure probability of n/1000, where n is the number of Monte Carlo simulations from the block predicting a failure. In practice, the method may generate blocks of samples exceeding one thousand to increase the accuracy of the predicted failure probability, or for designs requiring predicted failure rates far below 1/1000 samples. The method further determines confidence levels associated with the predicted probability of failure including upper and lower bounds for the predicted probability of failure.

As an example, the method accounts for the fact that an actual design may contain many more bitcells then sense amps. As a result, this method would sample the statistical variables in the bit cell at a higher rate than the sense amps. The worse performing bitcell "variant" will be used as the "master" Monte Carlo sample. This accounts for the fact that all of the bitcells must function with a given sense amp. Any bitcell that fails is equivalent to the entire circuit failing.

For computing the failure probabilities and confidence bounds, the method creates a probability density function based on outputs (or results) of the simulation of all of the components in the system under statistical analysis. Each value or point in the probability density function can be the result of the simulation on each of the multiple statistical system samples. For example, a block size of 1000 system samples would result in 1000 plotted data points from which a probability density function can be determined. The output or results of the simulation can be, for example, a measurement of a path delay through a memory circuit. The delay value can be measured in picoseconds and the value can be plotted (e.g., 5 ps, 5.2 ps, etc.). In one or more embodiments, the method creates a probability density function based on plotted output values of the simulation for each performance criteria in the system. Each performance criteria have their own probability density function based on the plotted simulation outputs across the multiple samples.

In an embodiment, the method calculates a confidence interval to determine the upper bounds a and lower bounds c of the output of the statistical analysis. In some embodiments, a Wilson confidence score can be utilized to determine the upper a and lower c bounds. The Wilson score is an estimate on the range of probabilities such that if the statistical analysis were repeated the result would be within the bounds 95% of the time. It is a function of the number of statistical samples and the number of failures. Therefore, the lower bound (in terms of sigma) is an estimate of the maximum failure probability and is used optimize the behavior of the statistical analysis. When given a target failure probability, the estimated failure probability b can be determined from the results of the statistical analysis and compared to the target probability. For example, if the target criteria states that any delays through a circuit component above 5.5 ps, can be counted as a failure, the failure probability estimate b is calculated based on the number of failures versus the total sample size of the simulation. In one or more embodiments of the invention, the method determines whether the target criteria is to determine a failure probability or to determine a threshold value that yields a specified target probability.

As an example, if the target criteria is to determine a threshold value that yields a specified target probability, then the method analyzes the simulation output results and the criteria with the lowest sigma (standard deviation) within the desired bounds (upper a and lower c) is removed from the analysis. That is to say, in the circuit simulation example, the method removes any circuit criteria that has a failing probability and a confidence interval (the upper a and lower c bounds, as calculated by the method) within a specified tolerance from further statistical analysis. In one or more embodiments of the invention, if the target criteria is a target probability for the simulated samples output, then the method compares probability estimate b to this target probability. If the target probability (e.g., output yields have a failure probability of the target probability) is met by the probability estimates b then the method leaves the criteria unchanged and the analysis continues. However, if the target probability does not match the probability estimate, then the method adjusts the criteria. For example, if a target criteria is to have a three (3) sigma delay failure in the output yield and the threshold delay value yields only a 2.5 sigma delay, then the threshold delay value can be adjusted to attempt to reach a 3 sigma delay failure in the next simulation. After the adjustment to the criteria, the method analyzes the lower bounds.

Since the proposed method is equivalent to Monte Carlo analysis, the advantages of this method include 1) statistical accuracy 2) no dependency on characterizing individual subcircuits separately 3) no assumptions on gaussian probability distributions 4) compatible with other Monte Carlo based methods such as Scaled Sigma Sampling.

Aspects of the present invention relate generally to statistical analysis of complex systems, such as integrated circuit designs, to assess system reliability. In embodiments, a systems analysis method defines or receives a model for a complex system design. The model includes instances associated with at least one layer of the design where the number of instances or variations associated with the layer relates to the number of components comprising the layer of the design. The method simulates the performance of the layer using performance probability density functions for the layer components. The method analyzes the simulated performances to identify a worst-case performance for the layer. The method then assigns the worst-case performance scenario to a master Monte Carlo simulation associated with the overall system.

Aspects of the invention provide an improvement in the technical field of systems failure analysis by enabling statistical analysis of complex systems without the typical computational complexity. Simulating the system using a simplified model and taking the complexity of the system into consideration through variations of the simplified model, the method reduces the computational resources required while delivering a statistically accurate simulation of system performance.

Aspects of the invention also provide an improvement to computer functionality. In particular, implementations of the invention are directed to a specific improvement to the way systems are simulated. The disclosed simulation methods require fewer computational resources to deliver accurate system performance results. By receiving a simplified model of a system and then simulating the performance of the simplified model at rates associated with the relative number of components in the actual system, disclosed embodiments achieve a statistically accurate measure of system performance and reliability using substantially fewer computing resources and time.

In an embodiment, one or more components of the system can employ hardware and/or software to solve problems that are highly technical in nature (e.g., receiving a system model, performing performance simulations of a model layer, the number of simulations associated with aa number of components associated with the layer, determining a worst-case performance scenario from the simulations, assigning the worst-case scenario to a master simulation, etc.). These solutions are not abstract and cannot be performed as a set of mental acts by a human due to the processing capabilities needed to facilitate system analysis, for example. Further, some of the processes performed may be performed by a specialized computer for carrying out defined tasks related to analyzing systems. For example, a specialized computer can be employed to carry out tasks related to the analysis of systems or the like.

In an embodiment, a method receives a design for a complex system, such as an integrated circuit design. The received design includes a simplified model of the actual design. Simplification of the actual design includes reducing the number of components in each layer of the actual design to a representative number of components in each layer of the simplified model. For example, an actual design including multiple bitcells feeding a single sense amplifier may be modeled as a single sense amp, a single active bitcell and a load cell representing inactive bitcells of the design. The provided model includes an equivalent number of hierarchical layers but fewer total components than the actual design. Inclusion of the load cell in the model accounts for the circuit behavior when fewer than all circuit bitcells are active during operations. The user further provides statistical parameters associated with the components of the design. As an example, the user provides statistical parameters associated with the operational performance of circuit elements of a chip design. Such statistical parameters relate to the geometry and metallurgy of the circuit elements of the chip design.

In this embodiment, the method determines a number of model variants based upon the component configurations and the number of components of the actual design. The number of variants exceeds the number of components, such as circuit components for the example. Each variant corresponds to a simulation of the statistical parameters of the components of the simplified model. The simulation takes into account the probability density function of the performance parameters of each component and generates random values within the defined probability density function for each model component. The method considers the set of simulated component performance statistics as a variant. As an example, the method receives a simplified model of an actual circuit having a single sense amplifier and ten subordinate bitcells. The simplified model includes a single sense amplifier and a single bitcell, together with the probability density functions associated with the known performance of those components. In this embodiment, the method simulates the performance of the actual circuit by simulating performance of the provided model ten times, corresponding to the number of bitcells in the actual design. The method oversamples the model of the design to compensate for the reduction in the number of circuit components from the actual design to the model. In an embodiment, the method oversamples the number of circuits to achieve a desired accuracy in determining a probability of failure. As an example, one thousand simulations provide an indication of the failure rate per thousand. To determine a failure probability closer to one in one million or greater, the method oversamples the provided model of the design to determine the probability of failure with the desired accuracy.

In an embodiment, the method considers an overall Monte Carlo sample for the model of the entire actual design. In this embodiment, the method determines worst-case scenario performances for respective sets of variants corresponding to portions of the overall system. The worst-case scenario performance represents the lowest level of performance across the set of variants corresponding to a portion of the actual system design. The method aggregates the worst-case scenarios for the sets of variants corresponding to each portion of the actual design, as one overall Monte Carlo simulation for the overall system design. As an example, for a system including one hundred sense amplifiers, each sense amplifier associated with a set of one hundred twenty-eight bitcells, the method performs one hundred twenty-eight variant simulations of a bitcell sense amplifier combination for each of the one hundred sense amplifiers. For each set of simulations, the method determines the worst-case performance and then aggregates the one hundred worst case scenarios as the aggregate overall simulation of the set of sense amplifier bitcell circuits. The method provides the overall Monte Carlo simulation comprising the aggregated worse case scenarios as an output to the block of Monte Carlo samples. In an embodiment, the method provides an output including a predicted failure probability for the actual design being evaluated. A user receives the output and evaluates the associated actual system design in terms of the predicted failure probability using the output. A user may evaluate the actual design using circuit element failure probabilities derived for the overall Monte Carlo simulation conducted suing the simplified model of the actual design. In an embodiment, the user alters the actual design in response to an unacceptable failure probability for the original design. In this embodiment, the user provides an altered simplified model of the altered design and the method performs new simulations using the altered model to determine failure probabilities for the altered design.

In an embodiment, the user applies scaled sigma sampling to the Monte Carlo simulation output to predict failure rates for systems where the original actual design and simplified model represent only a fraction of the overall system.

In an embodiment, the method evaluates variant simulations and determines the worst-case scenario for a set of simulations using an objective criteria for the corresponding actual design portion and simplified model. As an example, the method evaluates the performance of a set of ten circuit elements using ten variants each including a single circuit element. For this example, the method uses a criterion wherein the maximum value of the combined simulation outputs should be less than 4. The method identifies the variant having the largest value as the worst-case scenario. If that values exceeds the pass/fail threshold of 4 then the master sample for the simplified model is a fail.

In an embodiment, the method considers pass-fail criteria for the simplified circuit, such as a criterion requiring a simulation output less than one for a single circuit element. In this embodiment, performing a set of simulations, such as a set of one hundred twenty-eight simulations associated with a set of bitcells of the actual design, can be halted after any single simulation fails the objective criterion as there are no degrees of failure and any simulated failure represents a worst-case scenario. Once one simulation of the planned set of simulation has failed, no additional simulations of the set need be performed. The method ceases simulations for this set of simulations. The method assigns the failed simulation as the worst-case scenario for the set of variants to the overall simulation for the design and proceeds to the next planned set of simulations using the variants derived from the provided model of the actual design. In an embodiment, the method determines a failure probability for respective system components utilizing the number of relevant simulations performed using variants and the umber of failures predicted from the simulations.

In an embodiment, the method uses a trained machine learning classification model, such as convolutional neural network, recurrent neural network, generative adversarial network, variational autoencoder, support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like, to evaluate variant sets and identify variants and variant sets unlikely to contribute to a system failure. In an embodiment, the method uses historic performance data for similar system designs as training and validation data for the classification model. The trained model enables the rapid evaluation of hundreds of thousands, or millions of variants, before simulation of the variants. The classifier predicts a likelihood that variants will or will not contribute to a system failure. In an embodiment, the method uses the output of the classifier to identify variants which need not be simulated, reducing the time necessary to evaluate a proposed system design.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the system analysis program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., system analysis program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
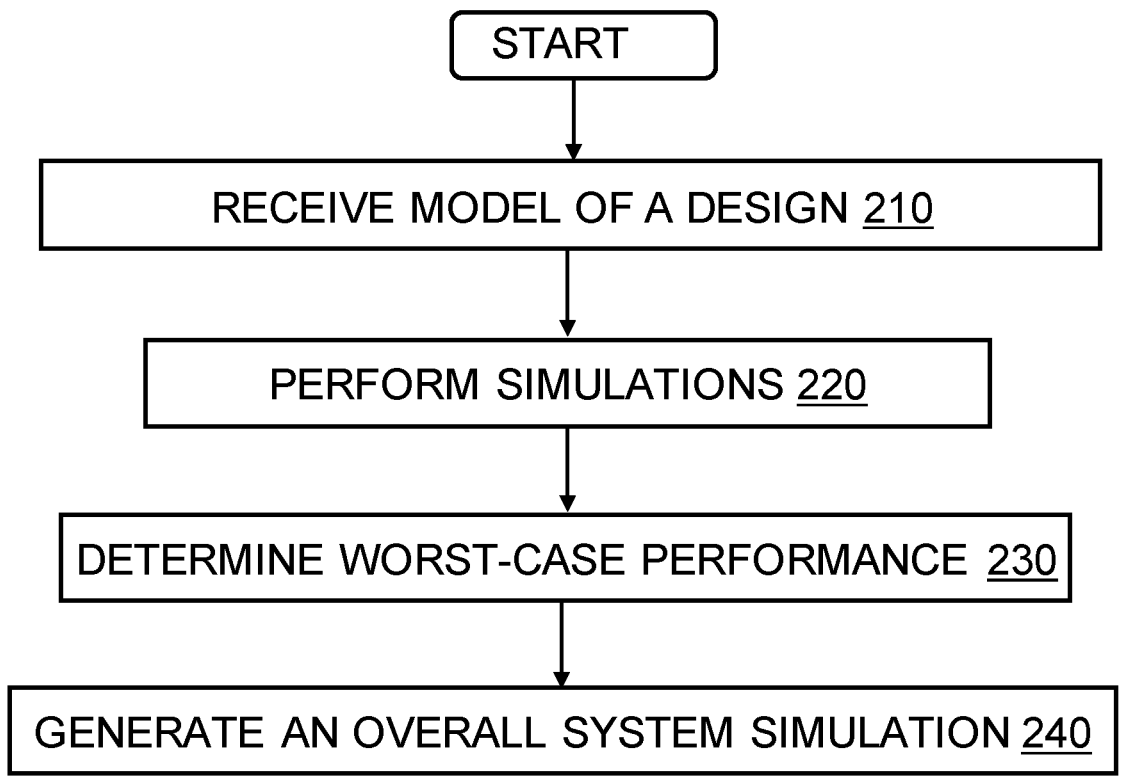
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of system analysis program 175, receives a simplified model of an actual design. The model reduces the number of components in each hierarchical layer of the design while retaining the number of hierarchical layers. The model includes statistical performance parameters for each model component. Such performance parameters relate to the actual design of the component and the likelihood of failure during actual performance.

At block 220, system analysis program 175, performs a plurality of simulations, the number of simulations determined according to the umber of components of the actual design. As an example, an actual design including one billion bitcells may correspond to a provided model including a single bitcell. For this example, the method performs a billion simulations of the single bitcell model. In an embodiment, the method determines the number of simulations according to a desired probability of failure accuracy or confidence level. In an embodiment, the method utilizes a trained machine learning classifier to predict failure probabilities of variants prior to actual simulations of the variants. In this embodiment, the method performs only those simulations predicted as likely to contribute to system failures, reducing the number of total simulations performed.

At bock 230, the method of system analysis program 175, determines a worst-case scenario for sets of simulated variants using performance criteria provided by the user for the actual design. Performance criteria such as circuit signal delay thresholds, or performance factors necessary to yield a desired probability of failure.

At block 240, the method assigns the worst-case scenario to an overall system simulation such as one overall Monte Carlo simulation of a defined block of Monte Carlo simulations defined for analyzing the actual system design using the provided model and performance statistics.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
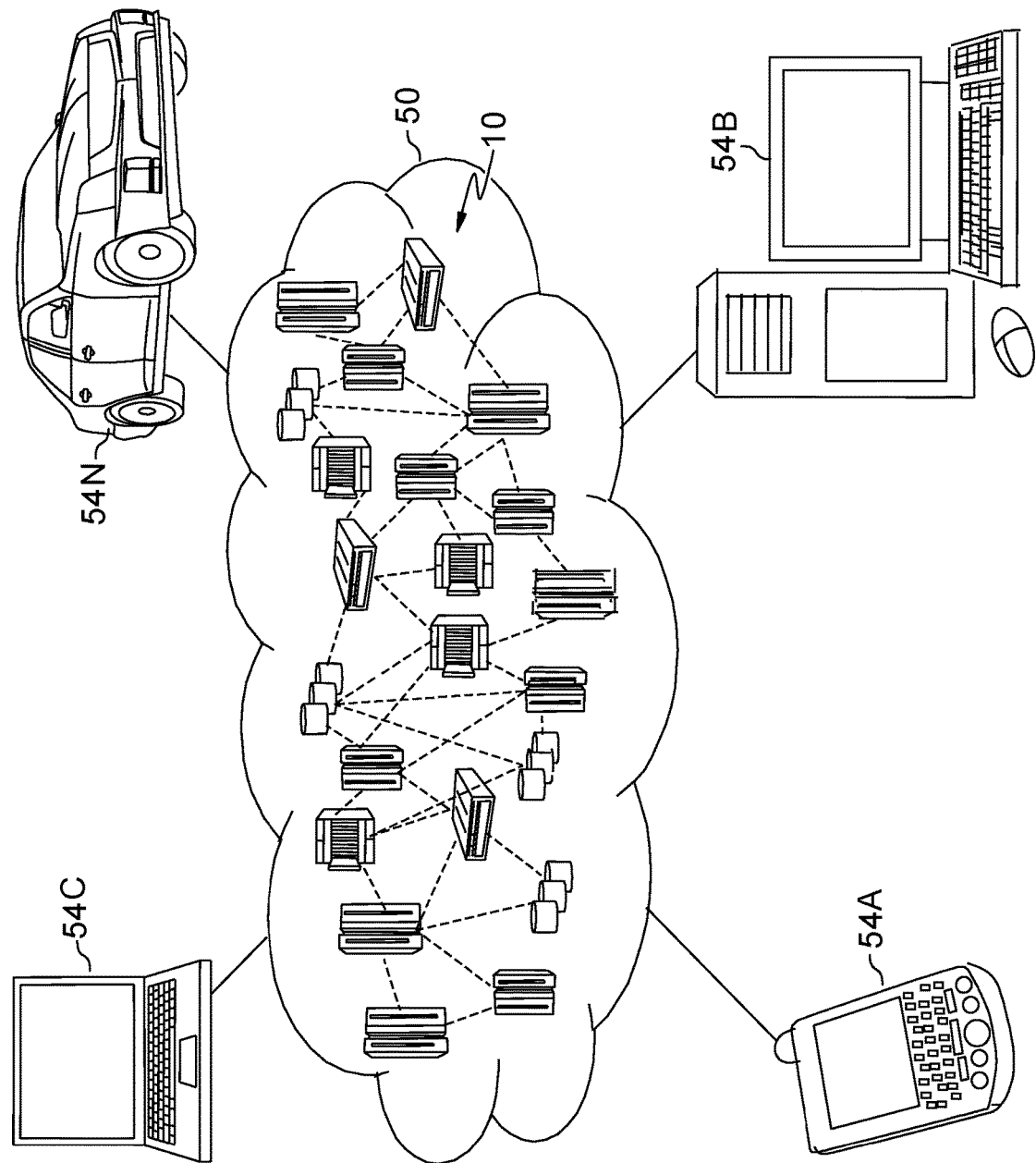
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system analysis program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for system analysis, the method comprising:
   receiving, by one or more computer processors, a model of a complex system design, wherein the model comprises a plurality of layers;
   performing, by the one or more computer processors, a plurality of simulations of a performance of each of at least two of the layers according to a probability density function of a performance parameter of a component of the respective layer, a number of simulations determined according to a number of a system component associated with each of the at least two of the layers;
   determining, by the one or more computer processors, a worst-case scenario performance representing a lowest level of the performance parameter for a set of simulations from the plurality of simulations; and
   assigning, by the one or more computer processors, the worst-case scenario performance to an overall system simulation.

2. The computer implemented method according to claim 1, further comprising:
receiving, by the one or more computer processors, a pass/fail criterion for a component: and
ceasing, by the one or more computer processors, simulation of the set of simulations in response to a simulated failure.

3. The computer implemented method according to claim 1, wherein determining the worst-case result for the layer comprises evaluating the plurality of simulated performance results using a machine learning model.

4. The computer implemented method according to claim 1, further comprising applying, by the one or more computer processors, scaled sigma sampling to the overall system simulation.

5. The computer implemented method according to claim 1, further comprising computing, by the one or more computer processors, failure probabilities for system components.

6. The computer implemented method according to claim 1, further comprising altering the complex system design according to the overall system simulation.

7. The computer implemented method according to claim 1, further comprising determining, by the one or more computer processors, a number of system variants for the layer according to the number of system components comprising the layer; and determining the number of simulations according to the number of variants.

8. A computer program product for system analysis, the computer program product comprising one or more computer readable storage devices and collectively stored program instructions on the one or more computer readable storage devices, the stored program instructions comprising:
program instructions to receive a model of a complex system design, wherein the model comprises a plurality of layers;
program instructions to perform a plurality of simulations of a performance of each of at least two of the layers according to a probability density function of a performance parameter of a component of the respective layer, a number of simulations determined according to a number of a system component associated with each of the at least two of the layers;
program instructions to determine a worst-case scenario performance representing a lowest level of the performance parameter for a set of simulations from the plurality of simulations; and
program instructions to assign the worst-case scenario performance to an overall system simulation.

9. The computer program product according to claim 8, the stored program instructions further comprising:
program instructions to receive a pass/fail criterion for a component: and
program instructions to cease simulation of the set of simulations in response to a simulated failure.

10. The computer program product according to claim 8, wherein determining the worst-case result for a set of simulations comprises evaluating the plurality of simulated performance results using a machine learning model.

11. The computer program product according to claim 8, the stored program instructions further comprising program instructions to apply scaled sigma sampling to the overall system simulation.

12. The computer program product according to claim 8, the stored program instructions further comprising program instructions to compute failure probabilities for system components.

13. The computer program product according to claim 8, the stored program instructions further comprising program instructions to alter the complex system design according to the overall system simulation.

14. The computer program product according to claim 8, the stored program instructions further comprising:
program instructions to determine a number of system variants for the layer according to the number of system components comprising the layer; and
program instructions to determine the number of simulations according to the number of variants.

15. A computer system for system analysis, the computer system comprising:
one or more computer processors;
one or more computer readable storage devices; and
stored program instructions on the one or more computer readable storage devices for execution by the one or more computer processors, the stored program instructions comprising:
program instructions to receive a model of a complex system design, wherein the model comprises a plurality of layers;
program instructions to perform a plurality of simulations of a performance of each of at least two of the layers according to a probability density function of a performance parameter of a component of the respective layer, a number of simulations determined according to a number of a system component associated with each of the at least two of the layers;
program instructions to determine a worst-case scenario performance representing a lowest level of the performance parameter for a set of simulations from the plurality of simulations; and
program instructions to assign the worst-case scenario performance to an overall system simulation.

16. The computer system according to claim 15, the stored program instructions further comprising:
program instructions to receive a pass/fail criterion for a component: and
program instructions to cease simulation of the set of simulations in response to a simulated failure.

17. The computer system according to claim 15, wherein determining the worst-case result for a hierarchical layer comprises evaluating the plurality of simulated performance results using a machine learning model.

18. The computer system according to claim 15, the stored program instructions further comprising program instructions to compute failure probabilities for system components.

19. The computer system according to claim 15, the stored program instructions further comprising program instructions to apply scaled sigma sampling to the overall system simulation.

20. The computer system according to claim 15, the stored program instructions further comprising:
program instructions to determine a number of system variants for the layer according to the number of system components comprising the layer; and
program instructions to determine the number of simulations according to the number of variants.

* * * * *